United States Patent Office 3,456,231
Patented July 15, 1969

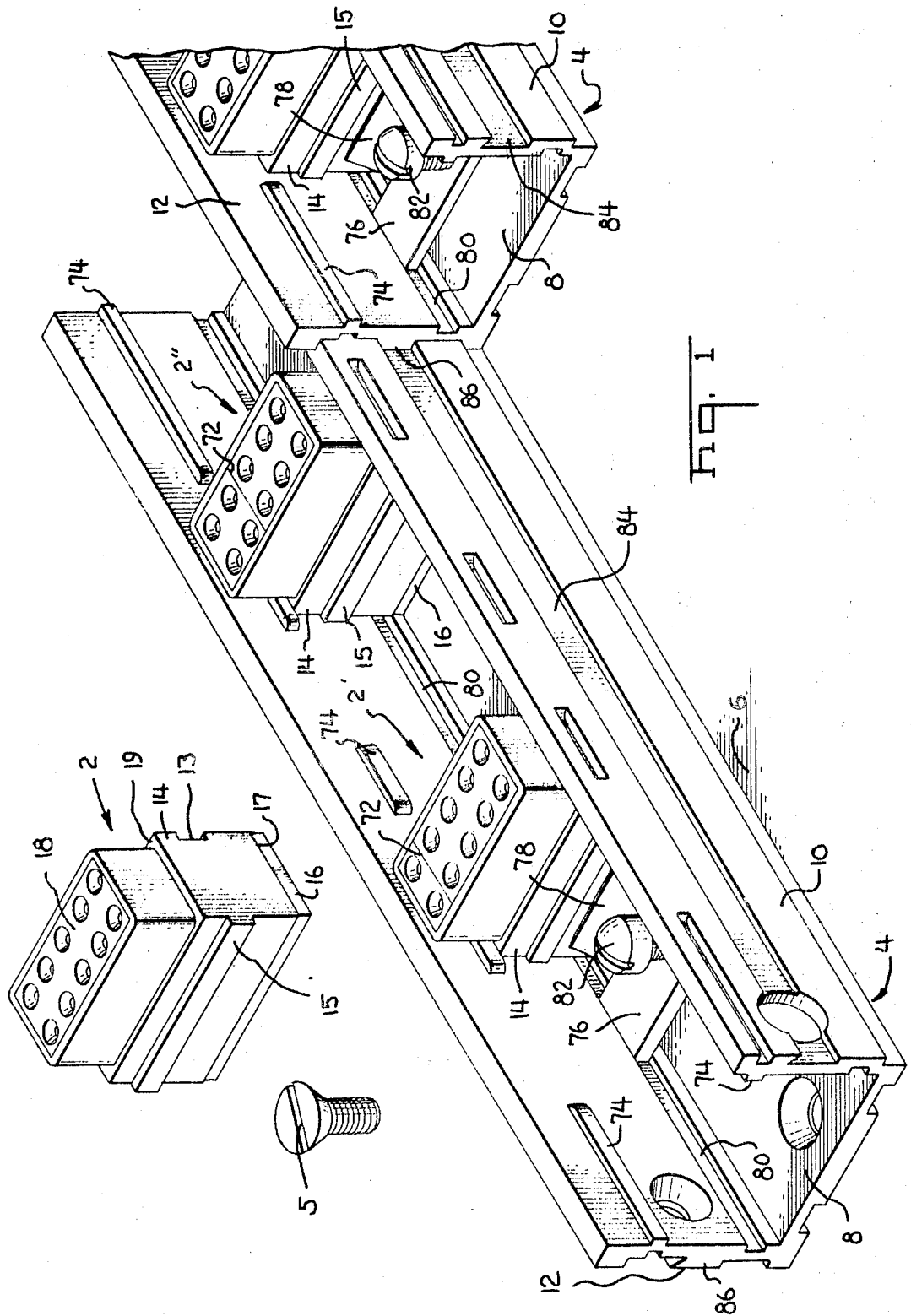

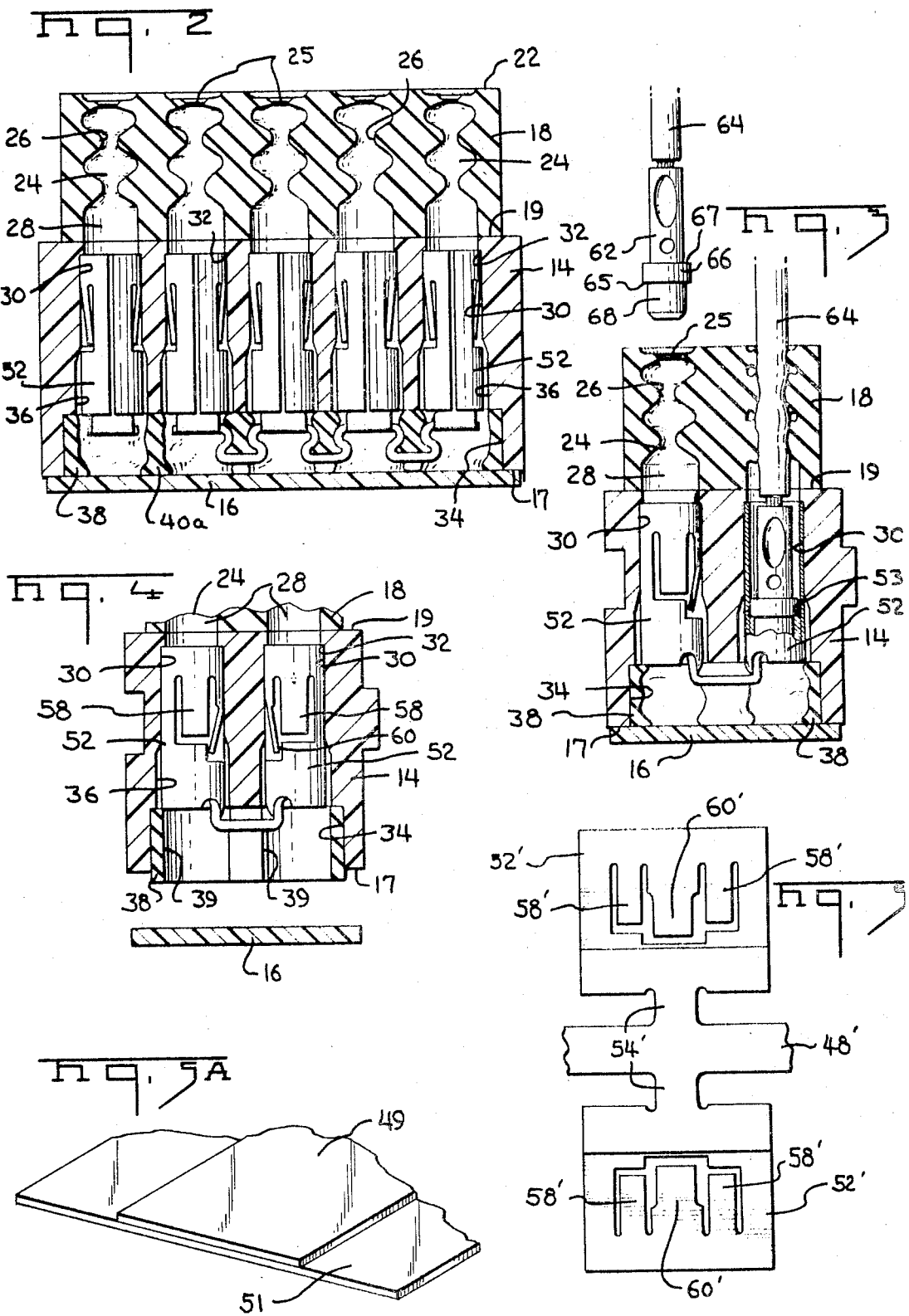

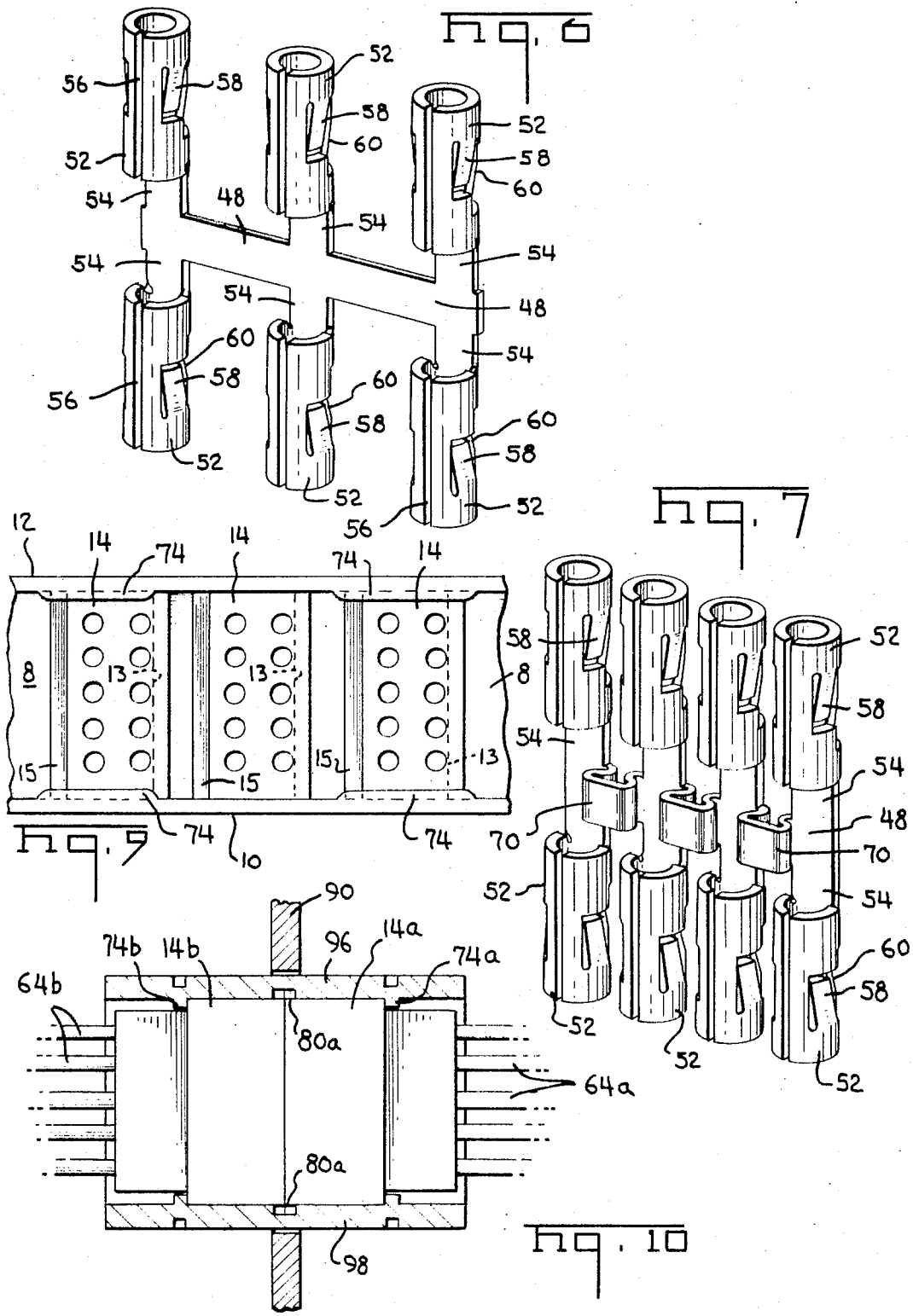

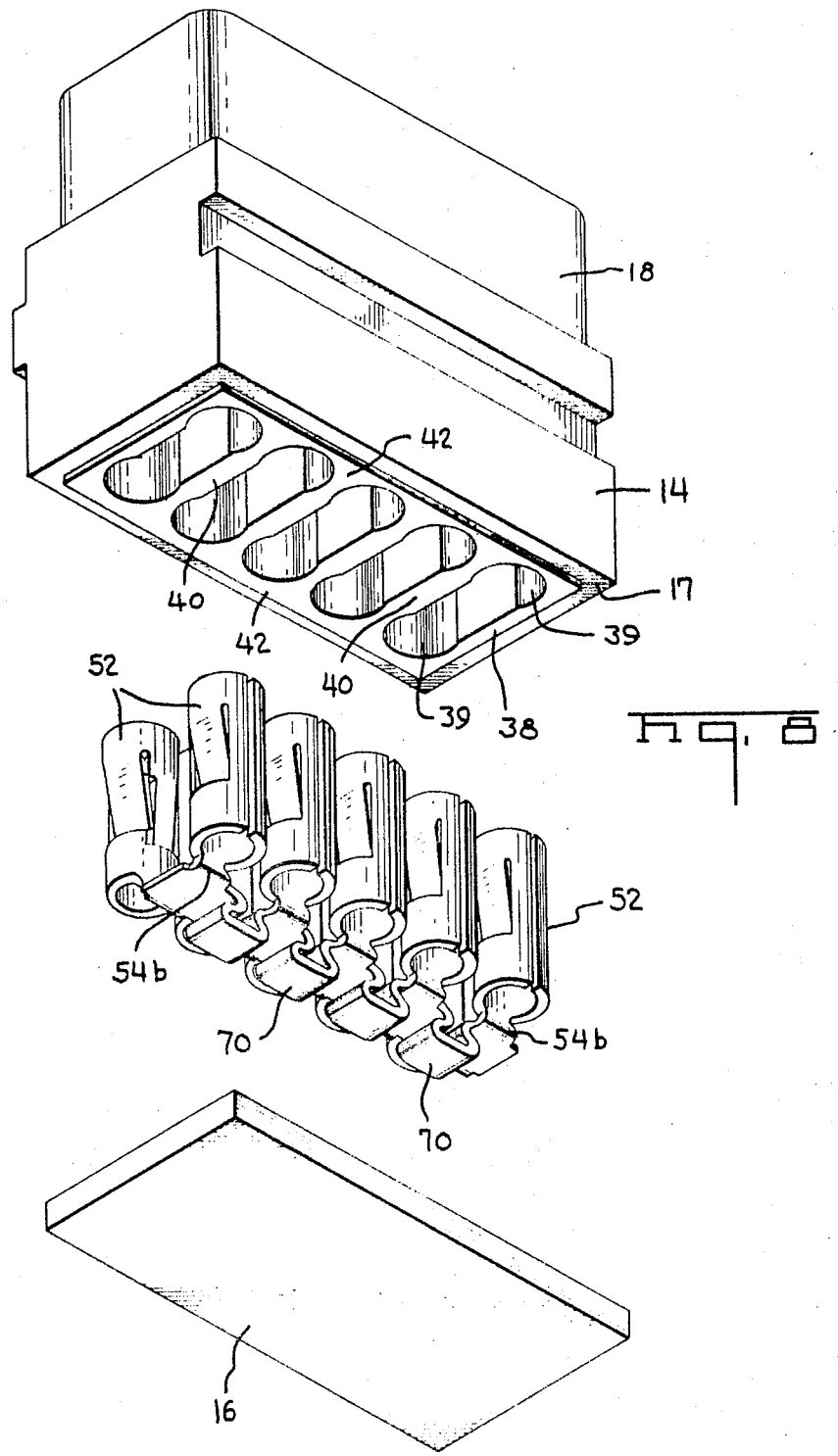

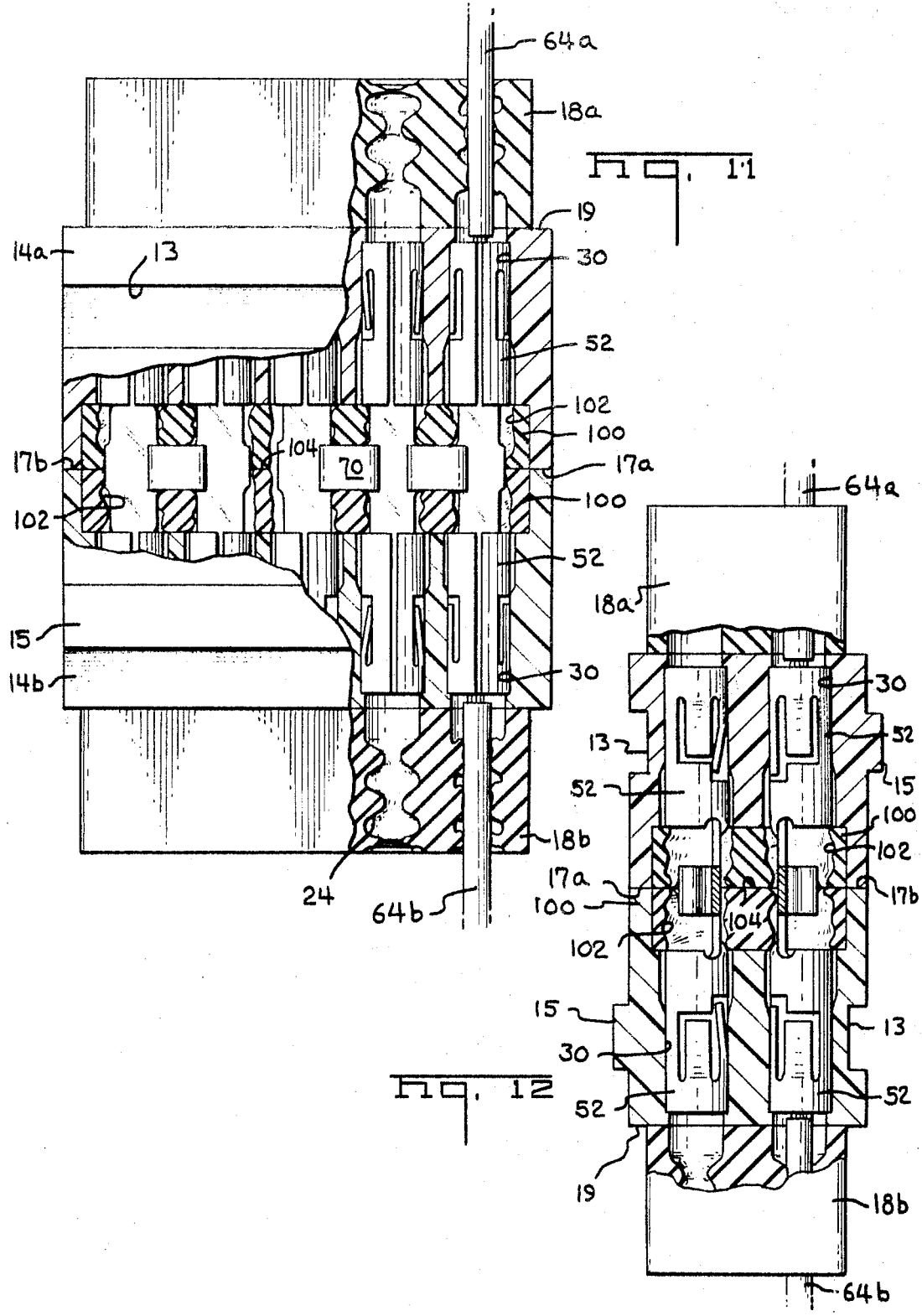

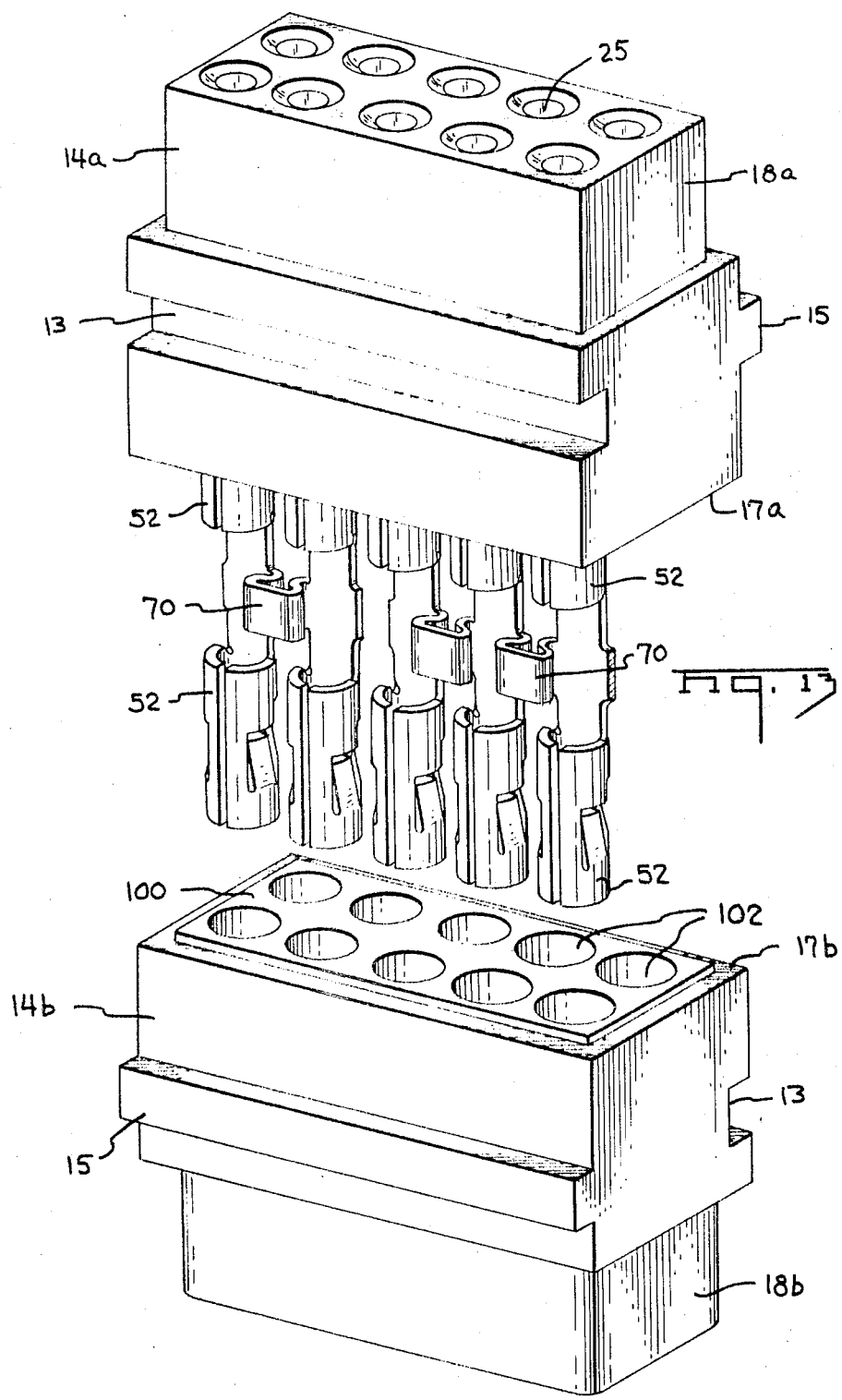

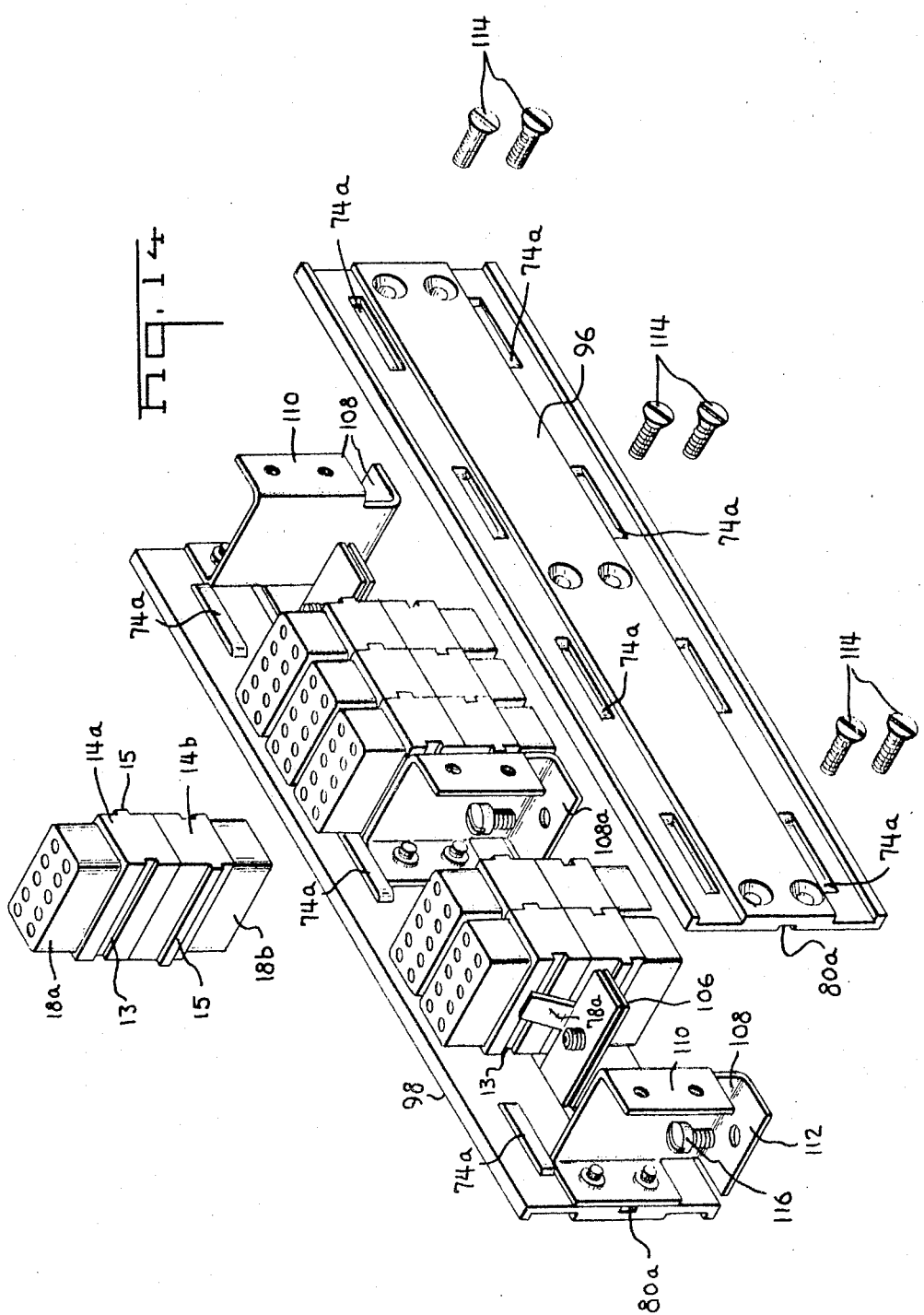

3,456,231
INTERCONNECTION WIRING SYSTEM
Clarence Leonard Paullus, Camp Hill, and John Aaron Zimmerman, Jr., Hershey, Pa., assignors to AMP Incorporated, Harrisburg, Pa.
Filed May 23, 1967, Ser. No. 640,649
Int. Cl. H01r 11/02, 13/60, 9/00
U.S. Cl. 339—60                                    17 Claims

ABSTRACT OF THE DISCLOSURE

Modular interconnection wiring system comprises a plurality of modules each having groups of contact receiving sockets therein. Each group of sockets comprises one or more pairs of individual sockets so that varying numbers of contact pins can be commonly connected. Modules and sockets can be assembled to each other in two different modes to achieve either interconnections among wires extending axially towards each other or interconnections among parallel wires extending to a function area. In accordance with one embodiment, modules are mounted en bloc between spaced-apart rails having means for retaining the modules between the rails but permitting removal of an individual module from the middle of a module stack.

BACKGROUND OF THE INVENTION

A wide variety of interconnection wiring systems or terminal junction systems, as they are commonly called, are known to the art, however, most of these systems are relatively bulky and are not environmentally sealed. Previously known systems have, for the most part, been used on stationary equipment of the type in which there are a few limitations on available space or where there are weight limitations imposed on the designer.

More recently, a need has arisen for an interconnection system which can be used under the exacting conditions of aircraft manufacture and similar circumstances. A further requirement is that the modular interconnection system be capable of commoning wires extending to a common junction area on one side of a bulkhead or wall and/or commoning wires in a junction area in a bulkhead, that is, forming common connections among wires extending towards opposite sides of the bulkhead. As with all high performance electrical connecting system which are used for aircraft or missile applications, the weight and space requirements of the system must be held to a minimum level, the contact interfaces should be sealed and the performance characteristics and reliability factors must be high as compared with more ordinary applications.

It is an object of the present invention to provide an improved interconnection wiring system. It is a further object to provide a modular wiring system capable of accommodating any desired number of wires. A still further object is to provide a modular wiring system having a minimum number of component parts which can be assembled to each other in different modes to achieve either feed-through wiring at a bulkhead (i.e. interconnections of wires on opposite sides of the bulkhead) or commoning of wires on one side of a bulkhead. A still further object is to provide an interconnecting wiring system which is environmentally sealed, which occupies a minimum amount of space, which is of minimum weight, and which, in general, satisfies the exacting requirements of aircraft or similar applications.

These and other objects of the invention are achieved in a preferred embodiment comprising a plurality of individual modular units, each unit containing a plurality of pairs of contact sockets. When the modules are assembled in a wiring system for commoning wires on one side of a bulkhead (a feed-to application), contact sockets are mounted in the modules in side-by-side parallel relationship. The arrangement is such that any desired numbers of pairs of sockets can be electrically integral with each other so that a common electrical junction is obtained among the inserted contact pins of each group. The modules are constructed in a manner such that the electrical contact areas are protected from the atmosphere. Furthermore, if two or more groups of contacts are mounted in an individual module, each group is environmentally separated from the adjacent groups in the same module. The module units can also be assembled to each other in a manner such that they can be mounted in a bulkhead opening to permit feed through of conductors from one side of the bulkhead to the other side. Again, commoning among a plurality of conductors on opposite sides of the bulkhead can be achieved by proper selection of the number of contacts which are electrically integral with each other.

In the drawings:

FIGURE 1 is a fragmentary perspective view of a preferred form of an interconnection system in accordance with the invention showing the manner in which the parts are arranged when it is desired to make common electrical connections on one side of a bulkhead or panel;

FIGURE 2 is a sectional side view of one of the modules of the interconnection system of FIGURE 1;

FIGURE 3 is a view taken along the lines 3—3 of FIGURE 2;

FIGURE 4 is a view similar to FIGURE 3 but illustrating the positions of the parts prior to final assembly;

FIGURE 5 is a plan view of a short section of blanked strip from which contact sockets in accordance with the invention are formed;

FIGURE 5A is a perspective view of the stock material from which the strip of FIGURE 5 is blanked;

FIGURE 6 is a perspective view of a short section of contact socket strip subsequent to forming of the sockets and prior to shortening of the pitch of the strip;

FIGURE 7 is a perspective view of a short section of socket strip after shortening of its pitch, the strip being used in this form for feed-through applications;

FIGURE 8 is a perspective exploded view of an individual module assembly of the type used for commoning a plurality of conductors;

FIGURE 9 is a plan view of a portion of the interconnection system of FIGURE 1 and illustrating the manner in which individual modules can be removed from the mounting means;

FIGURE 10 is a side view of a bulkhead feed-through application of the invention;

FIGURE 11 is a sectional side view illustrating the manner in which the contact sockets are mounted in the modules for bulkhead feed-through applications;

FIGURE 12 is a view taken along the lines 12—12 of FIGURE 11;

FIGURE 13 is a perspective exploded view showing the manner in which the parts are assembled to produce the bulkhead feed-through module of FIGURE 11; and FIGURE 14 is a fragmentary perspective view of a bulkhead feed-through system in accordance with the invention.

FIGURE 1 shows an interconnection system in accordance with the invention for making common electrical connections among a plurality of conductors on one side of a panel 6. The interconnections are made by means of a plurality of individual modules 2 which are mounted as a stack in side-by-side relationship in a frame means comprising mounting channels 4, these mounting channels each having a web 8 and sidewalls 10, 12. The mounting channels may be secured to the panel 6 by suitable fasteners as shown at 5.

The individual modules 2 (FIGURES 2-4) each comprise a central body or housing 14 of a suitable rigid insulating material such as epoxy or dyal phthalate having a plate 16 bonded or otherwise secured to its lower side 17 and having a resilient sealing block 18 bonded to its upper side 19, this sealing block being of a resilient insulating material such as a silicon rubber. A plurality of contact-receiving cavities or passageways 24 extend through the block 18 and are in alignment with contact cavities 30 in the central body portion 14 of the module. The cavities 20 extend downwardly from the upper side 22 of the sealing block 18 and have an upper portion as viewed in FIGURE 3 which is sinuous in cross-sections to define constricted neck portions 26. The lower portions of the cavities as shown at 28 are of cylindrical shape and communicate directly with the upper portions of the cavities 30 in the body portion 14. The constrictions 26 in the entrance passageways 24 have a width which is less than the diameter of the wire 64 to which an inserted contact pin 62 is crimped so that after insertion of the terminal pin into the block, the constricted portions 26 of the entrance passageways will bear against the wire to provide a sealing effect.

The sealing block 18 is advantageously manufactured by a suitable molding process and is formed with thin membrane-like walls 25 extending over, and closing off, the entrance portions of the passageways 24 in the block 18. When a terminal pin is inserted through any one of the passageways 24, this membrane or wall 25 is punctured but if a particular cavity in the module is not used in any instance, the module will nontheless be sealed by virtue of the presence of the unbroken membrane 25.

The contact receiving cavities 30 in the central housing portion 14 are adapted to receive contact sockets generally shown at 52 and described in further detail below. The cavities 30 are of uniform diameter in their intermediate portions but have a reduced diameter portion at their upper ends as viewed in FIGURE 2 to define a downwardly facing shoulder 32 against which an inserted contact socket bears. The lower portions of the cavities 30 are somewhat enlarged as shown at 36 and open into a rectangular recess 34 in the lower end of the housing portion 14.

A barrier insert 38 (FIGURE 8) of compressible insulating material such as silicone rubber fits into the recess 34 in the lower portion of the central housing 14 and has a plurality of openings 39 extending therethrough in alignment with the cavities in the housing portion 14. As is apparent from FIGURE 8, each opening 39 in the barrier insert 38 is in alignment with a pair of side-by-side cavities 30 in the housing portion 14. The openings 39 are separated by transverse walls 40 which extend between the sides 42 of the barrier insert so that each pair of associated cavities in the central housing 14 is isolated from the next adjacent pair of cavities. The barrier insert 38 normally extends slightly beyond the side 17 of the central section 14 of the module (see FIGURE 4) and is compressed (FIGURES 2 and 3) by the closure plate 16 which is bonded to the face 17 as previously noted. When this plate 16 is bonded to the face 17 of the housing, the projecting portion of the barrier insert 38 is compressed as shown at 38a thereby to provide a peripheral seal around the cavities extending through the module.

The contact sockets 52 which are contained in the modules 2 are manufactured in the form of a continuous strip from a laminated stock material (FIGURE 5A) having a base lamina 51 of beryllium copper or other high strength springy material and a contact lamina 49 of copper. The beryllium copper lamina extends laterally beyond the copper lamina on each side so that in the finished contact sockets, the contact portions of each socket 52 and the current carrying portions of the strip consist of pure copper having a high electrical conductivity. The contact springs of the sockets and the pin retainers, on the other hand, are of beryllium copper and have superior physical properties as will be explained below.

Referring to FIGURE 5, the strip 49, 51 is blanked to produce a plurality of pairs of socket blanks indicated at 52′ each of which is of generally rectangular shape and which is connected to a carrier strip 48′ by neck portions 54′ with the blanks 52′ of each pair aligned with each other on opposite sides of the carrier strip. A central contact spring 60′ is blanked from the strip in the form of a tongue extending inwardly towards the central carrier strip 48′. A pair of contact retaining springs 58′ are blanked from the strip blank 52′ on each side of the contact spring blanks 60′.

The socket blanks 52′ shown in FIGURE 5 are formed into cylinders as shown in FIGURE 6 having an axially extending seam 56 with the retainer springs 58 disposed on each side of the seam and directed obliquely inwardly towards the socket axis. The contact springs 60 of the individual sockets, which are on the opposite sides from the seams, are likewise directed obliquely towards the axis of the sockets. It will be apparent from FIGURES 5 and 6 that in each contact socket, the copper limina of the strip from which the sockets are formed is contained inside the sockets as a liner adjacent to the carrier strip and extends over, and covers, the carrier strip 48.

The pitch of the strip of contact sockets (i.e. the spacing between adjacent sockets 52) shown in FIGURE 6 is shortened by inward forming of the sections of the carrier strip extending between adjacent pairs of sockets as shown at 70. This shortening operation results in a keystone-like shape which permits the strip to be used in the housing modules 2 as will be explained below. Where the invention is being practiced to achieve bulkhead feedthrough of conductors as shown in FIGURE 10, the strip is used in the form shown in FIGURE 7 with the contact sockets in axial alignment on opposite sides of the carrier strip. When the invention is practiced to achieve commoning of conductors on one side of a bulkhead as in FIGURE 1, the neck portions 54 of the sockets are bent as shown at 54b (FIGURE 8) so that the individual pairs of sockets are in side-by-side parallel relationship.

When an individual module 2 is assembled, a section of strip in the form shown in FIGURE 8 is cut from a continuous length of strip and inserted as indicated into the module. Up to ten commonly connected contact sockets can be mounted in a single module by cutting off a length of five pairs of sockets as shown in FIGURE 8. These sockets are moved relatively through the barrier insert and into the cavities in the housing portion 14 of the module until their leading ends move against the shoulders 42 of the cavities which shoulders function as stops for the strip. When a ten socket length of strip is mounted in a module, the bridging portions 70 of the strip will extend over the walls 40 of the barrier insert and compress these walls as is illustrated in FIGURES 2 and 3. As previously noted, final assembly of the cover plate 16 to the module side 17 seals the module from the atmosphere.

An advantage of the invention as described thus far is that an individual module can be fitted with various combinations of commonly connected sockets. For example, if it is desired to have five individual pairs of sockets in a module (that is, five pair electrically separated from each other but with the two sockets of each pair connected to each other) it is merely necessary to sever individual pairs of sockets from the strip by cutting the carrier strip on each side of the pair of sockets and discarding the folded portions 70 of the carrier strip. The individual connected pairs of sockets 52 are then fitted into a pair of side-by-side cavities 30 and the cover plate 16 is assembled to the module as previously described. In a module of this type, containing five separated pairs of sockets, the barrier walls 40 between the openings of the barrier insert 38 are not compressed by the carrier strip but these walls 40 bear against and are compressed by the surface of the plate 16 so that the separate pairs of commonly connected sockets are each sealed from each other. Other combinations, as regards the number of commonly connected sockets in an individual module, can be achieved by merely using the appropriate length of socket strip for the appropriate number of severed pairs of sockets. FIGURES 2 and 3 illustrate a module having eight commonly connected sockets (which appear on the right in FIGURE 2) and one pair of separate sockets (which appear on the left in FIGURE 2). The pair of commonly connected sockets which appear on the left in FIGURE 2 and which are shown in FIGURE 3 are sealed from the atmosphere and from the remaining sockets in the module by the compressed barrier wall indicated at 40a. Advantageously, the individual modules are provided with marking lines 72 on their sides 22 to delineate the commonly connected sockets in the module. Thus, in FIGURE 1, the module exploded from the channel has ten electrically common sockets therein. The module 2′ in the channel contains two commonly connected sockets in combination with eight commonly connected sockets. The module 2″ contains four commonly connected sockets and six commonly connected sockets, the commonly connected sockets in each module being surrounded by the marking boundaries 72 as shown.

The sockets 52 are dimensioned to receive contact pins 62 (FIGURE 3) which are crimped onto the end of conductors 64. The contact pins 62 are of a conventional type manufactured by screw machine operations and have a collar 66 integral therewith adjacent to their contact end portions 68. Upon insertion of an individual contact pin into one of the cavities in a module, the shoulder 65 defined by the lower side of the collar 66 moves against the shoulder 53 defined by the copper conductor material 49 of the contact socket and the retaining springs 58 of the socket lodged against the shoulder 67 defined by the upper side of the collar 66. The contact spring 60 of the socket bears against the surface of the collar 66 so that the contact end portion 68 of the contact pin is pressed against the surface of the copper conductor material of the strip. The individual contacts can be removed from the modules by the use of a suitable extraction tool which is inserted through the cavity in surrounding relationship to the wire 64, and pin until the end of the extraction tool moves against the shoulder 37 of the collar 66 whereby the retainer springs 58 are biased outwardly permitting withdrawal of the contact and the extraction tool as a unit.

Modules 2 in accordance with the invention can be mounted in any suitable manner on a bulkhead or panel. FIGURE 1 shows a preferred mounting system which has the advantage of permitting the removal of individual modules for servicing or for other purposes without disassembly of the entire interconnection system. In accordance with this mounting system, the sidewalls 10, 12 are provided with spaced-apart projections in the form of inwardly formed ribs 74, the ribs on the sidewalls 10 being opposite to the ribs on the sidewall 12. These ribs are located a distance above the surface of the web 8 of the mounting rail such that the downwardly facing sides of the ribs will bear against the ledges 19 of the individual modules thereby preventing upward movement of the modules and removal from the rails. The spacing between adjacent ribs in the sidewalls is slightly greater than the width of the individual modules so that when it is desired to remove a module, an entire row of modules can be slid until the module to be removed is disposed between adjacent ribs of the sidewalls. The module can then be moved upwardly from the rail in which it is mounted without disturbing the remaining modules in that particular rail as illustrated in FIGURE 9. The stock of modules in an individual rail or channel 4 is clamped therein by means of a plate 76 the edges of which are received in grooves 80 in the sidewalls 10, 12 adjacent to the web 8. Plate 76 has an obliquely upwardly extending tongue 78 which bears against the end of module of the stack and a clamping screw 82 is threaded through this plate so that upon tightening this screw, it becomes impossible to move the clamping plate or the modules in the mounting rail. The individual modules have interfitting ribs and grooves indicated at 13 and 15 on opposite sides of the housing portion 14. Thus the rib 15 of each module is received in the groove 13 of an adjacent module thereby to prevent removal of an individual module unintentionally. The modules must thus be separated from each other before removal can be accomplished as also illustrated in FIGURE 9.

If desired, the sidewalls 10 of the mounting rails can be provided with longitudinally extending grooves 84 adapted to receive similarly shaped ribs 86 on the outside surface of the sidewall 12, of an immediately adjacent rail. As shown in FIGURE 1, this arrangement permits two or more rails to be interlocked thus forming an assembly of rails. An assembly of this type can be mounted in a suitable surrounding frame if desired.

FIGURES 10–14 show the manner in which the parts of the previously described interconnection system can be assembled to each other and used for bulkhead feed-through applications. In FIGURE 10, a module unit 14a, 14b is shown as being mounted between rails, described below, which in turn are mounted in an opening in a panel 90. This wiring arrangement permits the achievement of interconnections among conductors 64a, extending from the right in FIGURE 10, and conductors 64b, extending from the left, towards the panel 90.

Individual modules for this feed-through arrangement are composed of a pair of the previously identified housing sections 14 and identified in FIGURE 13 as 14a, 14b. Each housing section 14a, 14b is provided with a resilient sealing block 18a, 18b as previously described and a barrier insert 100 which is comparable to, but which differs slightly from, the barrier insert 38 previously described. Particularly, the barrier inserts 100 are provided with a number of openings 102 equal to the number of cavities 30 and in alignment with the cavities 30 in the housing sections 14a, 14b. As with the barrier inserts 38, the barrier inserts 100 are of compressible material and normally project slightly beyond the sides 17 of the module housings 14a, 14b.

The terminal strip in this embodiment is employed in its unbent condition, that is, with the contact sockets of each pair of contact sockets in axial alignment with each other on opposite sides of the carrier strip as shown in FIGURES 2 and 13. To assemble the module, the parts are aligned with each other as shown in FIGURE 13 and the upwardly directed contact sockets are inserted into the cavities in the upper housing section 14b while the downwardly directed contact sockets are inserted into the corresponding cavities in the housing section 14a. Again, various interconnection arrangements can be achieved by proper selection of the length of carrier strip. In FIGURE 13, one section of contact socket strip is shown of a length such that it contains three upwardly directed sockets and three downwardly directed sockets and another section is shown having two upwardly directed contact sockets and two downwardly directed sockets. When these two sections of socket strips are inserted into the composite module, the arrangement will be as shown in FIGURE 11; in this figure, the three pairs of contact sockets in the upper portion (as viewed in FIGURE 11) of the module are commonly connected while the two pairs of sockets in the lower portion of the module are separate from the upper sockets but are electrically connected to each other. It will be seen in FIGURE 11 that the common contact sockets in the upper portion of the module are environmentally sealed from the sockets of the lower portion of the module by the compressed mating faces of the barrier insert as indicated at 104.

After assembly of the contact sockets strip to the module housing as indicated in FIGURE 13, the housing sections 14a, 14b are bonded or otherwise secured to each other along their mating faces 17a, 17b to produce the composite feed-through module shown in FIGURES 11 and 12. Modules of this type are mounted between the opposing faces of the rails 96, 98 as shown in FIGURES 10 and 14. The inner surfaces of the rails 96, 98 are provided with inwardly formed ribs or bosses 74a, 74b which hold the modules in position. As with the previously described embodiment, the ribs 74a, 74b are discontinuous thereby to permit removal of the individual modules from the stack.

The modules are retained between the rails 96, 98 by means of clamping devices 106. Each of these clamping devices comprise a pair of the previously described plates 76 disposed against each other and having their ends extending into grooves 80a of the opposed faces of the rails 96, 98. The tongues 78a of the clamps bear against the sides of the end modules of the stack to hold the stack against movement. Screws threaded through one of the plates 76 of each clamp bear against the other plate and function to wedge the plates apart thereby to lock the ends of the plates in the grooves 80a.

The rails 96, 98 are held in spaced-apart relationship by spacers 108 having flanges 110 on their sides which are secured to the rails by fasteners 114. An additional flange 112 is provided to permit the assembly to be clamped to a panel with the modules accessible from either side of the panel through a suitable opening. Under some circumstances, it may be desirable to provide additional clamps 108a intermediate the ends of the rails 96, 98. For example, if interconnection systems has a relatively large number of modules, the modules can be arranged in several stacks with one or more intermediate clamping plates 108a being provided to support the rails intermediate their ends.

The embodiment of the invention shown in FIGURES 10–14 to form common electrical connections to mounting the modules against a mounting panel in an orientation such that the axes cavities in the modules extend parallel to the plane of the panel. This arrangement can be achieved, for example, by mounting either one of the rails 96, 98 on the panel. Several mounting options are thence available to the user who can select the system that best satisfies his needs.

A salient advantage of the invention is that a wide variety of interconnection arrangements for both feed-through and commoning applications can be achieved with a relatively low number of parts. The terminal strip as shown in FIGURE 6 as shortened by formation of the keystone shaped folds 70 and is used with the contacts in alignment with each other for feed-through applications or with the contacts bent through a 90° angle for commoning applications. The housing sections 14 can be used either for feed-through applications or feed-to applications as can the sealing blocks 18. A further significant feature of the invention is that each group of commonly connected contact sockets are mechanically and electrically integral with each other and in the disclosed embodiment electrical contact is made with the copper conducting strip in the socket strip. The fact that the contact springs 60 in the contact sockets are integral with the socket strip is advantageous in that a redundant contact between the pins and the sockets is achieved. Thus, if contact between the end of a pin and the copper portion of the socket should be lost for any reason (e.g. vibration, presence of foreign matter, etc.) there would still be electrical contact via the contact spring 60 and the collar 66 of the pin.

Changes in construction will occur to those skilled in the art and various apparently different modifications and embodiments may be made without departing from the scope of the invention. The matter set forth in the foregoing description and accompanying drawings is offered by way of illustration only.

What is claimed is:

1. A device for making disengageable electrical connections among a plurality of conductors comprising, an insulating housing having a plurality of contact-receiving cavities extending therethrough from a first side to a second side, the material of said second side between said cavities being resiliently deformable, first and second contact terminals in first and second cavities, said first and second cavities being adjacent to each other, connecting strip means electrically joining said first and second contact terminals, said connecting strip means extending between said first and second cavities on said second side and holding the insulating material on said second side between said first and second cavities in a compressed and resiliently deformed condition.

2. A device as set forth in claim 1 including a second insulating housing, said insulating housings having their second sides disposed against each other with said cavities of said housings in axial alignment, third and fourth contact terminals in third and fourth cavities in said second insulating housing, said third and fourth cavities being in alignment with said first and second cavities, said third and fourth contact terminals being electrically connected to said connecting strip means whereby said contact terminals are electrically common, said connecting strip means compressing the insulating material on said second side of said second housing.

3. A device as set forth in claim 1 including cover means covering said second side confining said contact terminals in said housing, said device being adapted to commonly connect conductors extending into said cavities from said first side and having mating terminal devices on their ends, said mating terminal devices being in engagement with said contact terminals.

4. A device as set forth in claim 1 wherein said contact terminals comprise contact sockets.

5. A device for making disengageable electrical connections among a plurality of conductors comprising, an insulating housing having a plurality of contact-receiving cavities extending therethrough from a first side to a second side, the material of said second side between said cavities being resiliently deformable, first and second contact sockets in first and second cavities, said first and second cavities being adjacent to each other, said contact sockets having been formed as a continuous strip and being integral with a carrier strip extending normally of the axis of said sockets, said carrier strip extending between said first and second cavities on said second side and holding the insulating material on said second side in a compressed and resiliently deformed condition.

6. A device as set forth in claim 5 including a second insulating housing, said insulating housings having their second sides disposed against each other with said cavities of said housings in axial alignment, third and fourth contact sockets in third and fourth cavities in said second insulating housing, said third and fourth cavities being in alignment with said first and second cavities, said third and fourth sockets being integral with said carrier strip, said carrier strip extending into, and compressing the material of the second side of said second housing between said third and fourth cavities.

7. A device as set forth in claim 6 wherein said sockets each have a lining of highly conductive metal adjacent to said carrier strip, said carrier strip comprising a laminate having a highly conductive lamina, said highly conductive lamina being integral with said linings of said sockets.

8. A device as set forth in claim 7 wherein each of said sockets has at least two lances struck from, and integral with, its sidewall, said lances extending obliquely inwardly with respect to the axes of their respective sockets, one of said lances in each socket constituting a contact spring for engaging an inserted contact pin and the other of said lances in each socket constituting a retainer for retaining an inserted contact pin in the socket.

9. A device as set forth in claim 5 wherein the material of said first side is resiliently deformable, said cavities having internal constrictions adjacent to said first side whereby upon insertion of a conductor and contact pin into any one of said cavities, the constructed portions of said cavities bear against said conductor to seal said device.

10. A device as set forth in claim 5, said device, and a plurality of similar devices, being contained between a pair of spaced-apart parallel mounting rails said devices each having a ledge on sides adjacent to said two sides, said mounting rails having inwardly extending ribs on their opposed sides, said ribs being in engagement with said ledges to retain said devices between said rails.

11. A device as set forth in claim 10 wherein said ribs are discontinuous, the spacing between adjacent ribs being greater than the width of one of said devices whereby any one of said devices can be removed from between said rails, each of said devices having interlocking means in engagement with adjacent devices to retain said devices against unintentional removal.

12. A device for making disengageable electrical connections among a plurality of conductors said conductors extending substantially axially towards each other, said device comprising a pair of insulating housings, each housing having a plurality of contact-receiving cavities extending therethrough from a first side to a second side, the material of said second side between said cavities being resiliently deformable, said housings being secured to each other with their second sides against each other to form an interconnection module, a plurality of cavities extending through said housings, the corresponding cavities of said housings being in axial alignment with each other, a strip of contact sockets, said strip comprising a central carrier strip having integral contact sockets extending laterally therefrom in opposite directions, said strip being contained in said module with said carrier strip between said second sides of said housings and with said socket contacts extending into said cavities, said carrier strip being embedded in, and compressing, the material of said second sides of said housings, said module being adapted to receive contact pins inserted through said first sides of said housings and into said sockets whereby the conductors secured to said contact pins are commonly connected.

13. A module as set forth in claim 12 wherein the number of said contact sockets is less than the number of said cavities, said module containing a second strip of contact sockets, said second strip being environmentally sealed from said first strip by said material on said second sides of said housings.

14. A modular terminal junction system comprising:
    frame means comprising first and second sidewalls, said sidewalls being spaced-apart and parallel to each other,
    a plurality of projections on the opposed surfaces of said sidewalls, each of said projections on said first sidewall being in alignment with one of said projections on said second sidewall, said projections being spaced-apart by a predetermined distance along the lengths of said sidewalls,
    a plurality of connector modules between said sidewalls, said modules being disposed snugly against each other to form a stack, the width of each module, as measured along the length of said stack, being less than said predetermined distance,
    each of said modules having means interengaging with the modules immediately adjacent thereto, said interengaging means being effective to prevent movement of any one module laterally of said stack but permitting separation of the modules in said stack,
    clamping means at each end of said stack, said clamping means holding said modules against each other in said stack,
        said projections extending over portions of selected modules of said stack thereby preventing lateral movement of said selected modules from said stack, the remaining modules of said stack being retained in said stack by virtue of said interengaging means, an individual module located intermediate the ends of said stack being removable from said system by unclamping said clamping means, moving the modules on each side of said individual module in opposite directions away from said individual module, and moving said individual module laterally of said frame means between adjacent projections.

15. A system as set forth in claim 14 wherein said frame means comprises a channel member, said first and second sidewalls comprising the sidewalls of said channel member.

16. A system as set forth in claim 15 wherein said projections are located between the web of said channel member and the marginal edges of said sidewalls.

17. A system as set forth in claim 14 wherein said sidewalls comprise first and second rails, said modules being adapted to receive contact terminals on each of two oppositely directed sides, each rail having said projections arranged in pairs, the projections of each pair extending over a module adjacent to said opposite sides.

References Cited

UNITED STATES PATENTS

| | | | |
|---|---|---|---|
| 3,065,440 | 11/1962 | Bonwitt et al. | 339—18 |
| 3,245,029 | 4/1966 | Piperato. | |
| 3,275,765 | 9/1966 | Ferdon et al. | 200—51.1 |
| 3,296,576 | 1/1967 | Motten | 339—176 |
| 3,336,569 | 8/1967 | Nava | 339—217 |
| 3,345,599 | 10/1967 | Henschen et al. | 339—18 |

FOREIGN PATENTS

| | | |
|---|---|---|
| 1,274,032 | 9/1961 | France. |
| 1,017,241 | 10/1957 | Germany. |

MARVIN A. CHAMPION, Primary Examiner

JOSEPH H. McGLYNN, Assistant Examiner

U.S. Cl. X.R.

339—121, 198, 217, 278